(12) United States Patent
Bercovici et al.

(10) Patent No.: US 12,088,730 B2
(45) Date of Patent: *Sep. 10, 2024

(54) TRACKING PROVENANCE OF DIGITAL DATA

(71) Applicant: PencilData, Inc., Livermore, CA (US)

(72) Inventors: Valentin Bercovici, Livermore, CA (US); Kumarappan Palaniappan, San Jose, CA (US)

(73) Assignee: PencilData, Inc., Livermore, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/574,150

(22) Filed: Jan. 12, 2022

(65) Prior Publication Data

US 2022/0141034 A1 May 5, 2022

Related U.S. Application Data

(63) Continuation of application No. 16/428,481, filed on May 31, 2019, now Pat. No. 11,228,444.

(Continued)

(51) Int. Cl.
*H04L 9/40* (2022.01)
*H04L 9/06* (2006.01)
*H04L 9/32* (2006.01)

(52) U.S. Cl.
CPC .......... *H04L 9/3247* (2013.01); *H04L 9/0637* (2013.01); *G06F 2218/12* (2023.01)

(58) Field of Classification Search
CPC .. H04L 9/3247; H04L 9/0637; G06F 2218/12
See application file for complete search history.

(56) References Cited

U.S. PATENT DOCUMENTS 9,547,704 B1 * 1/2017 Deus ................. G06F 16/27
9,990,504 B1    6/2018 Chapman et al.
(Continued)

FOREIGN PATENT DOCUMENTS

EP    3319006 A1    5/2018
WO    2017136879 A1    8/2017
(Continued)

OTHER PUBLICATIONS

Zhang, Olive Qing, et al., "How To Track our Data: The Case for Cloud Computing Provenance", Hewlett-Packard Development Company, L.P., Jan. 21, 2012, pp. 1-9., Jan. 12, 2012, pp. 1-9.

*Primary Examiner* — Ghodrat Jamshidi
(74) *Attorney, Agent, or Firm* — Perkins Coie LLP; Kristen Schunter; Sean Lee

(57) ABSTRACT

A data authentication system stores a token representing data distributed from a data source to a data recipient, allowing the data recipient to authenticate the data. The data authentication system receives, from a data source, a first token that represents a digital entity distributed by the data source to a data recipient. A representation of the first token is sent for storage on a blockchain. A request is received from a data recipient to authenticate the digital entity, where the request includes a second token that represents the digital entity as distributed to the data recipient. The data authentication system authenticates the second token against the stored first token to verify that the data recipient received authentic data.

20 Claims, 4 Drawing Sheets

Related U.S. Application Data

(60) Provisional application No. 62/746,361, filed on Oct. 16, 2018, provisional application No. 62/678,477, filed on May 31, 2018.

(56) References Cited

U.S. PATENT DOCUMENTS

| | | | |
|---|---|---|---|
| 9,992,028 B2* | 6/2018 | Androulaki | H04L 9/14 |
| 10,181,948 B1 | 1/2019 | Nenov et al. | |
| 10,469,487 B1* | 11/2019 | Griffin | H04L 63/061 |
| 10,805,068 B1 | 10/2020 | Leise et al. | |
| 10,930,377 B2* | 2/2021 | Pickover | H04L 9/3239 |
| 11,070,379 B2* | 7/2021 | Yang | H04L 9/3247 |
| 2003/0120611 A1 | 6/2003 | Yoshino et al. | |
| 2008/0027867 A1 | 1/2008 | Forbes et al. | |
| 2009/0006842 A1 | 1/2009 | Ross et al. | |
| 2013/0226867 A1 | 8/2013 | Lee et al. | |
| 2016/0283920 A1 | 9/2016 | Fisher et al. | |
| 2016/0292672 A1 | 10/2016 | Fay et al. | |
| 2018/0144114 A1* | 5/2018 | Fiske | G06F 21/32 |
| 2018/0285839 A1* | 10/2018 | Yang | G06Q 20/40 |
| 2018/0294966 A1* | 10/2018 | Hyun | H04L 9/3226 |
| 2018/0302222 A1* | 10/2018 | Agrawal | H04W 4/70 |
| 2019/0005470 A1* | 1/2019 | Uhr | H04L 9/3239 |
| 2019/0020468 A1 | 1/2019 | Rosenoer | |
| 2019/0182028 A1 | 6/2019 | Arquero et al. | |
| 2019/0207768 A1 | 7/2019 | Hardy et al. | |
| 2019/0356473 A1* | 11/2019 | Rosenoer | G06Q 20/065 |
| 2020/0007316 A1* | 1/2020 | Krishnamacharya | H04L 9/3231 |

FOREIGN PATENT DOCUMENTS

| | | |
|---|---|---|
| WO | 2017178956 A1 | 10/2017 |
| WO | 2018026727 A1 | 2/2018 |

* cited by examiner

TRACKING PROVENANCE OF DIGITAL DATA

CROSS-REFERENCE TO RELATED APPLICATION(S)

This application is a continuation of U.S. patent application Ser. No. 16/428,481, filed May 31, 2019, which claims the benefit of U.S. Provisional Patent Application No. 62/678,477, filed May 31, 2018, and U.S. Provisional Patent Application No. 62/746,361, filed Oct. 16, 2018, each of which are incorporated herein by reference in their entirety.

TECHNICAL FIELD

This disclosure relates to tracking provenance of digital data.

BACKGROUND

Digital data is commonly shared between organizations and/or individuals. As data is shared, both the provider of the data and the recipient of the data typically want to ensure that the data has not been modified in transmission. However, it can be challenging to verify that the data is unchanged, especially when the data is passed between large numbers of intermediaries or recipients or when long periods of time elapse between the creation and use of the data. Furthermore, the development of artificial intelligence is increasing the ease with which nefarious actors can tamper with data, while reducing the ability of the data's recipients to detect its illegitimacy. For example, the rise of "deep fakes," in which voice recordings or video footage of a person are manipulated to change the person's words or actions, has made detecting data integrity an urgent issue.

DETAILED DESCRIPTION

Figure 1:
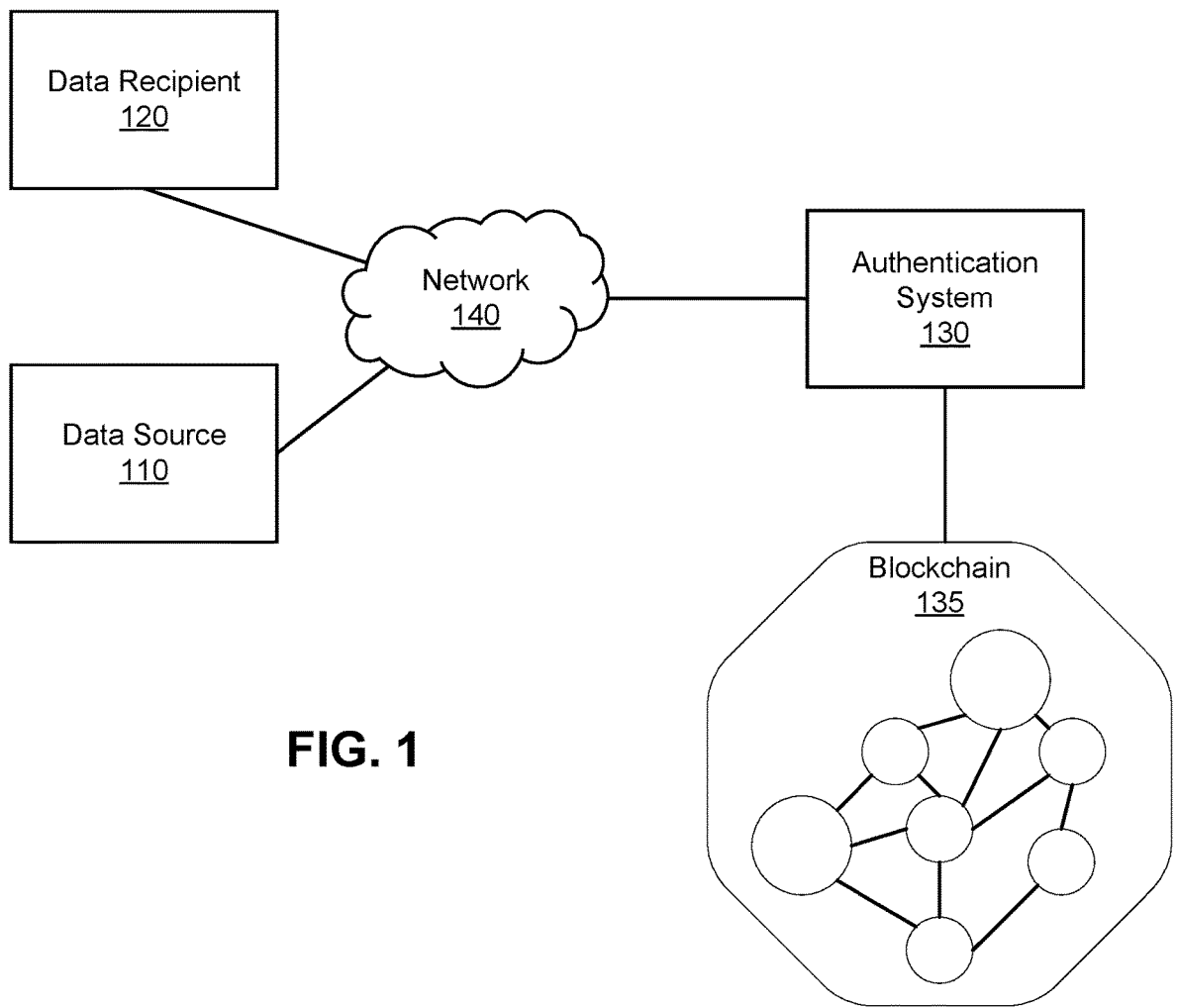
FIG. 1 is a high-level block diagram illustrating a system for authenticating digital data, according to some embodiments.

A system and method are described for authenticating digital data. A data source generates a data fingerprint that represents digital data and stores the data fingerprint on a blockchain. Recipients of the digital data can verify the authenticity of the received data by generating a fingerprint representing the received data and comparing the generated fingerprint to the data fingerprint stored on the blockchain. Storing the fingerprint on the blockchain, rather than the data itself, preserves privacy of the data while enabling the data recipient to verify the data's provenance.

In some embodiments, a data authentication system includes a processor and a non-transitory computer readable storage medium that stores computer program instructions. When executed by the processor, the computer program instructions cause the processor to receive a data fingerprint generated by a data recipient and an identifier of data distributed to the data recipient by a data source. The data fingerprint includes an encoded representation of the data, and a representation of the data fingerprint (such as the data fingerprint itself, or a parity fingerprint that encodes multiple data fingerprints) is stored on a blockchain. Using the received identifier, the processor accesses a data fingerprint received from the data source. The data fingerprint received from the data recipient is validated against the data fingerprint received from the data source, and the data is authenticated responsive to the data fingerprint received from the data source matching the data fingerprint received from the data recipient.

In some embodiments, a method for authenticating data using data fingerprints comprises storing, by a data authentication system, a plurality of data fingerprints each received from a data source and representing data distributed by the data source to a data recipient. The data authentication system can generate a parity fingerprint encoding the plurality of data fingerprints, and write the parity fingerprint to a blockchain. A fingerprint generated by the data recipient and encoding data distributed to the data recipient by the data source can be received from the data recipient. The fingerprint received from the data recipient can be validated against the plurality of stored data fingerprints, and the stored plurality of data fingerprints can be validated using the parity fingerprint written to the blockchain.

In some embodiments, a non-transitory computer readable storage medium stores computer program instructions that, when executed by a processor, cause the processor to receive from a data source, a first data fingerprint that represents a digital entity distributed by the data source to a data recipient. The processor sends the first data fingerprint for storage on a blockchain. The processor receives a request from the data recipient to authenticate the digital entity, where the request includes a second data fingerprint that represents the digital entity as distributed to the data recipient. The processor authenticates the second data fingerprint against the stored first data fingerprint.

FIG. 1 is a block diagram illustrating a system 100 for authenticating digital data, according to some embodiments. As shown in FIG. 1, the system 100 can include a data source 110, a data recipient 120, an authentication system 130, and a blockchain 135 communicatively coupled over a network 140. The system 100 can include additional or different entities than shown in FIG. 1. For example, the system 100 may include multiple data sources 110 or data recipients 120, or can include other intermediate systems that transfer data between the data source 110 and data recipient 120.

The data source 110 generates, maintains, or otherwise provides digital data. The data source 110 includes one or more computing devices capable of communicating data over the network 140, such as a server, a personal computer, or a mobile phone. A person or entity may use the data source 110 to generate or collect data and to distribute the data to other computing devices. Alternatively, the data source 110 may partially or wholly autonomously aggregate data from one or more third parties before distributing the data.

The data source 110 can organize data into digital entities for distribution. A digital entity is a logical representation of a set of data, and any amount of data can be included in a digital entity. A digital entity can include any data type or combination of data types, including, for example, documents, photos, videos, audio files, software code, algorithms, models, graphs, and/or data sets. As one example, a digital entity is prepared by an automobile insurance company for data associated with a vehicle accident. The insurance company, which may use or communicate with the data source 110, collects documents such as photos of vehicle damage, police reports, and documentation associated with the parties' insurance claims. A digital entity is formed that bundles the documentation and can be provided to the insured person, other parties to the accident, the insurance provider for the other parties, or other individuals as needed. As another example, a university prepares a digital entity that includes a student's grades for a given term. In still another example, an autonomous vehicle manufacturer packages files, such as camera frames, LiDAR telemetry, infrared sensor data, and GPS data, into a digital entity that can be distributed to vehicles. Digital entities can also be generated for sensor data collected from sensors distributed around homes, cities, or manufacturing plants. Other digital entities can be generated for medical records, experimental data, survey results, or models and datasets for artificial intelligence applications.

The data source 110 generates one or more data fingerprints representing a digital entity or a portion of digital data. The term "data fingerprint" is used herein to refer to an encoded representation of data, and can represent one or more of a fingerprint, a hash value, a checksum, or another encoded representation. To generate the data fingerprint, the data source 110 applies a function to at least a portion of the data or digital entity that outputs a representation of the data or portion of data. The function can be any of a variety of hashing functions, checksum functions, fingerprinting algorithms, or other similar functions that generate encoded representations of data. By way of example, a portion of data to which the function may be applied can include numbers or strings of text that represent important numerical values, names, or times in the data. The data source 110 may alternatively extract all data from the digital entity for hashing. The function is a deterministic function that, when applied to the extracted data, maps the extracted data to one or more data fingerprints. The function can be injective, mapping data values each to unique data fingerprints, or surjective, potentially mapping multiple data values to the same data fingerprint. In some cases, the function is infeasible to invert, such that the data cannot be feasibly reconstructed based on the data fingerprint alone. The same or different hash functions may be used to encode different digital entities, and the data source 110 may provide the hash function(s) to data recipients 120 when distributing the data or data entities.

The data recipient 120 receives a digital entity from the data source 110. Like the data source 110, the data recipient 120 can include any computing device capable of communicating data over the network 140. The data recipient 120 can be operated by or affiliated with a person or organization who is interested in the data included in the digital entity.

The data recipient 120 authenticates the digital entity by generating a data fingerprint of the received entity using the same function applied by the data source 110. If the data fingerprint generated by the data recipient 120 matches the fingerprint generated by the data source 110, a user of the data recipient 120 can be assured that the digital entity has not been modified.

The authentication system 130 facilitates data authentication using the data fingerprints generated by the data source 110. The authentication system 130 securely stores the data fingerprints from the data source 110 and authenticates data fingerprints received from the data recipient 120 against the stored fingerprints. If a data fingerprint generated by a data recipient 120 matches the data fingerprint generated by the data source 110, the data recipient 120 can be assured that the data has not been changed since it was generated or compiled by the data source 110.

The authentication system 130 interfaces between the blockchain 135 and the data source 110 or the data recipient 120. The authentication system 130 receives and stores data fingerprints generated by the data source 110 for the digital entities created by the data source 110. When a data recipient 120 requests to authenticate a digital entity, the authentication system 130 receives a data fingerprint generated by the data recipient and compares the received data fingerprint against the data fingerprint stored on the blockchain 135.

In some cases, the authentication system 130 maintains a database to store data fingerprints received from the data source 110. To ensure the integrity of the stored data fingerprints, the authentication system 130 can generate parity fingerprints that encode the contents of the database. In various embodiments, the parity fingerprints can be used in addition to the data fingerprints to authenticate data distributed to a data recipient 120.

The authentication system 130 communicates with a blockchain 135 to store encoded representations of data on the blockchain 135. The blockchain 135 includes a distributed ledger maintained by a plurality of computing devices or nodes. In various embodiments, the encoded representations of data the authentication system 130 writes to the blockchain 135 include the data fingerprints, the parity fingerprints, or both data and parity fingerprints. For example, a data fingerprint of particularly sensitive data can be written to the blockchain 135, while fingerprints of less sensitive data can be stored in the database maintained by the authentication system 130 and only the parity fingerprint of the database written to the blockchain 135.

The network 140 enables communication between the data source 110, data recipient 120, and authentication system 130. The network 140 may include one or more local area networks (LANs), wide-area networks (WANs), metropolitan area networks (MANs), and/or the Internet.

Figure 2:
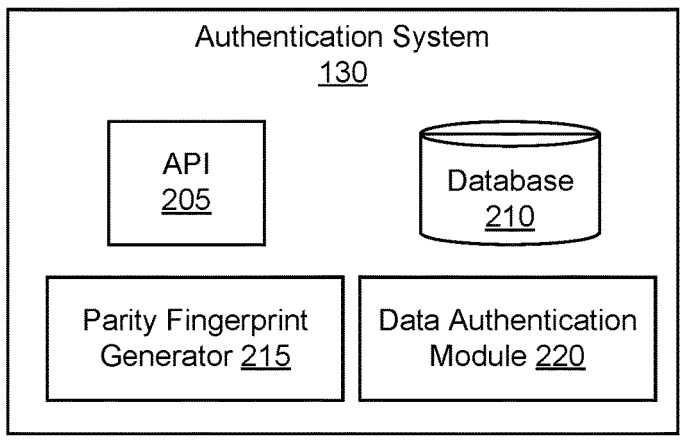
FIG. 2 is a block diagram illustrating functional modules executable by an authentication system, according to some embodiments.

FIG. 2 is a block diagram illustrating functional modules executable by the authentication system 130. As shown in FIG. 2, the authentication system 130 can execute an application programming interface (API) 205, a parity fingerprint generator 215, and a data authentication module 220, as well as maintain a database 210. The modules 205, 215, 220 can be software modules that are executable by a processor of the authentication system 130, hardware modules, or a combination of software and hardware. Furthermore, the authentication system 130 can include additional, fewer, or different modules than shown in FIG. 2, and the described functionality can be distributed differently between the modules.

The API 205 facilitates communications between the authentication system 130 and one or more other computing devices, such as the data source 110, data recipient 120, and computing devices associated with the blockchain 135. The API 205 can communicate with the data source 110 to receive data fingerprints from the data source 110 that represent data generated or maintained by the data source 110. The API 205 can also write fingerprints to the blockchain 135, such as the data fingerprints received from the data source 110 or parity fingerprints of the database 210. When a data fingerprint is received from the data source 110, the API 205 can store the fingerprint in the database 210, write the fingerprint to the blockchain 135, or both.

In some embodiments, the API 205 generates smart contracts to store data fingerprints or parity fingerprints on the blockchain 135. Each smart contract stores one or more fingerprints and can be triggered by an input, such as a unique identifier of a digital entity, to output the stored fingerprint. The API 205 can also log requests to access the fingerprints on the blockchain. In some embodiments, the API 205 logs a failed access attempt on the blockchain immediately. Successful access attempts can be batched and logged on the blockchain after the batch reaches a threshold number of successful attempts or after a specified length of time.

The database 210 can store data fingerprints generated by the data source 110. To ensure integrity of the stored fingerprints, the database 210 can have full global replication, audit trails, and/or point in time transaction-level backups. In various embodiments, the database 210 can be stored by the authentication system 130 (e.g., in a memory of the authentication system 130) or by an external device with which the authentication system 130 communicates to write data to or read data from the database 210.

The parity fingerprint generator 215 generates parity fingerprints that represent at least a portion of the database 210. Each parity fingerprint can be an encoded representation of a plurality of data fingerprints in the database 210, and can be generated by any of a variety of functions such as a hash function, a checksum function, or a fingerprinting algorithm. In some embodiments, the parity fingerprint generator 215 archives at least a portion of the database 134 at periodic intervals, such as once per hour, and generates a parity fingerprint of the archive. In other embodiments, the parity fingerprint generator 215 generates a parity fingerprint that represents a specified number of fingerprints in the database 210, for example generating a parity fingerprint for each set of one hundred fingerprints added to the database 210. Each parity fingerprint can be stored with an identifier of the portion of the database 210 that is represented by the parity fingerprint. The parity fingerprint generator 215 can also generate parity fingerprints on demand when a data recipient 120 requests authentication of data, allowing the parity fingerprint generator 215 to verify integrity of the data fingerprints in the database 210.

The parity fingerprint generator 215 writes the parity fingerprints to the blockchain 135 or sends the parity fingerprints to the API 205 to write to the blockchain. Like the data fingerprints recorded on the blockchain, the parity fingerprint can be written into a smart contract that is recorded on the blockchain 135 and configured to output the parity fingerprint. Because the blockchain 135 provides immutable recordkeeping, the contents of the database 210 can be verified against the parity fingerprints stored on the blockchain 135. The parity check can therefore provide an additional layer of trust to the database 210, while reducing transactional costs and computing resources over storing the data fingerprints or the underlying data itself on the blockchain 135.

The data authentication module 220 authenticates data distributed to the data recipient 120. As described above, a data recipient 120 can generate a data fingerprint of data distributed to the recipient 120. The data authentication module 220 receives the data fingerprint from the recipient 120 and compares the fingerprint to a data fingerprint received from the data source 110. If the data fingerprint received from the recipient 120 matches the data fingerprint received from the data source 110, the data authentication module 220 authenticates the data.

In some cases, when a data fingerprint received from the data source 110 is stored on the blockchain 135, the data authentication module 220 authenticates the data by retrieving the data fingerprint from the blockchain 135. For example, the data authentication module 220 sends an identifier of the data to a smart contract stored on the blockchain 135, and the smart contract in response outputs the data fingerprint received from the data source 110. In other cases, where the data fingerprint received from the data source 110 is stored in the database 210, the data authentication module 220 authenticates the data by retrieving the data fingerprint from the database 210 and retrieving the parity fingerprint for the portion of the database 210 that includes the data fingerprint from the blockchain 135. The data authentication module 220 can also generate, or request from the parity fingerprint generator 215, a parity fingerprint indicating the state of the database 210 when the data fingerprint was retrieved. The generated parity fingerprint, indicating the state of the database at the time of the fingerprint retrieval, can be compared to the parity fingerprint stored on the blockchain to authenticate the data fingerprints in the database 210. If there is a match between both the data fingerprint received from the data recipient 120 and the data fingerprint stored in the database 210, as well as the parity fingerprint indicating the current state of the database and the parity fingerprint stored on the blockchain 135, the data authentication module 220 authenticates the data that was distributed to the data recipient 120.

Figure 3:
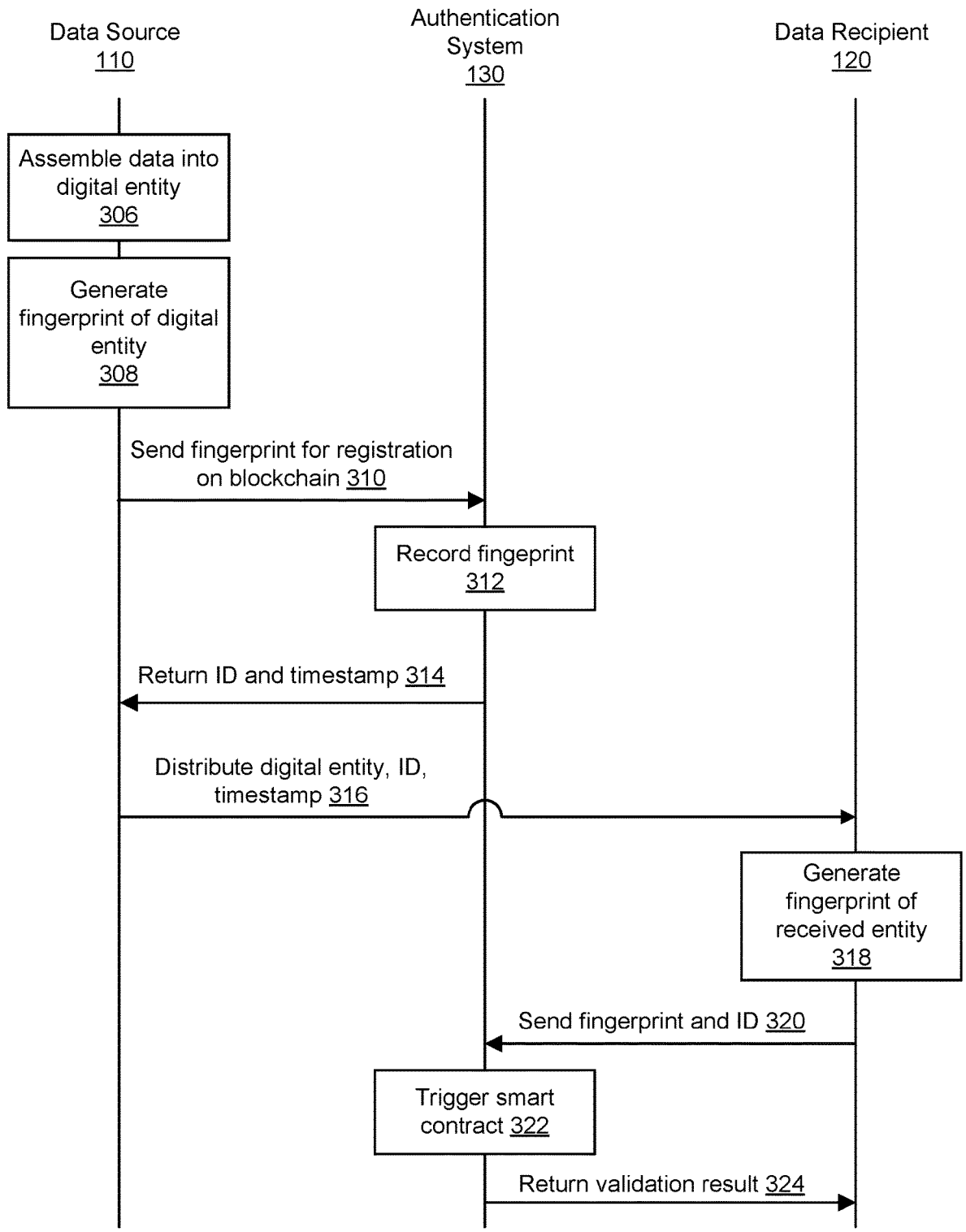
FIG. 3 is an interaction diagram illustrating a process for authenticating digital data, according to some embodiments.

FIG. 3 is an interaction diagram illustrating a process 300 for authenticating digital data, according to some embodiments. As shown in FIG. 3, the process 300 can include interactions between the data source 110, the blockchain 135, and the data recipient 120. The process 300 can include additional, fewer, or different steps, and the steps can be performed in different orders.

As shown in FIG. 3, the data source 110 can assemble 306 data into a digital entity. The digital entity may represent a single data item (e.g., a number), a collection of data items (e.g., numbers extracted from a spreadsheet), a collection of one or more files (e.g., one or more documents each stored as a unique file), a code repository, or any other data structure, file structure, or logical representation of a set of digital data. The data source 110 generates 308 a data fingerprint for at least a portion of the digital entity. Alternatively, the data source 110 can generate 308 the data fingerprint for data that is not part of a digital entity.

The data source 110 records the data fingerprint on the blockchain 125, optionally using the API 205. The data source 110 sends 310 the data fingerprint to the API 205, which records 312 the data fingerprint of the digital entity on the blockchain 135. When a data fingerprint 135 is recorded on the blockchain via the API 205, the API outputs 314 an identifier of the entity and a timestamp indicating when the data fingerprint was recorded. The entity identifier and the timestamp may be output within a token generated by the API, such as a JSON web token.

In one embodiment, the data fingerprint is recorded to the blockchain 135 via a smart contract. The authentication system API 205 writes the data fingerprint into the smart contract, which defines a protocol by which a user or system, such as the data recipient 120, can access the data fingerprint value. For example, the smart contract comprises computer program code that is configured to cause the smart contract to output the data fingerprint value in response to receiving an identifier of the digital entity corresponding to the contract.

After the data fingerprint is recorded on the blockchain 135, the data source 110 can share the data with any desired target audience(s) affiliated with one or more of the data recipients 120. To share the data, the data source 110 can distribute 316 the digital entity and the identifier of the entity and timestamp output by the authentication system API 205. The data source 110 may use any of a variety of communication channels to send the digital entity to the data recipient 120, including both electronic channels (such as transmitting data over the Internet) and physical channels (such as mailing a physical package to a person associated with the data recipient 120).

The data recipient 120 can authenticate the entity at any point after receiving it by generating 318 a data fingerprint of the received entity. The data fingerprint of the received entity is generated using the same fingerprint function used by the data source 110. The data recipient 120 sends 320 the generated data fingerprint and the entity identifier and timestamp received from the data source 110 to the authentication system API 205.

The authentication system API 205 triggers 322 the smart contract associated with the entity identifier. When triggered, the smart contract outputs the data fingerprint stored on the blockchain by the data source 110. If the output fingerprint matches the data fingerprint received from the data recipient 120, the API 205 returns 324 a validation result indicating that the data entity is valid. If the fingerprints do not match, the validation result returned by the API 205 indicates that the data entity has been modified.

Figure 4:
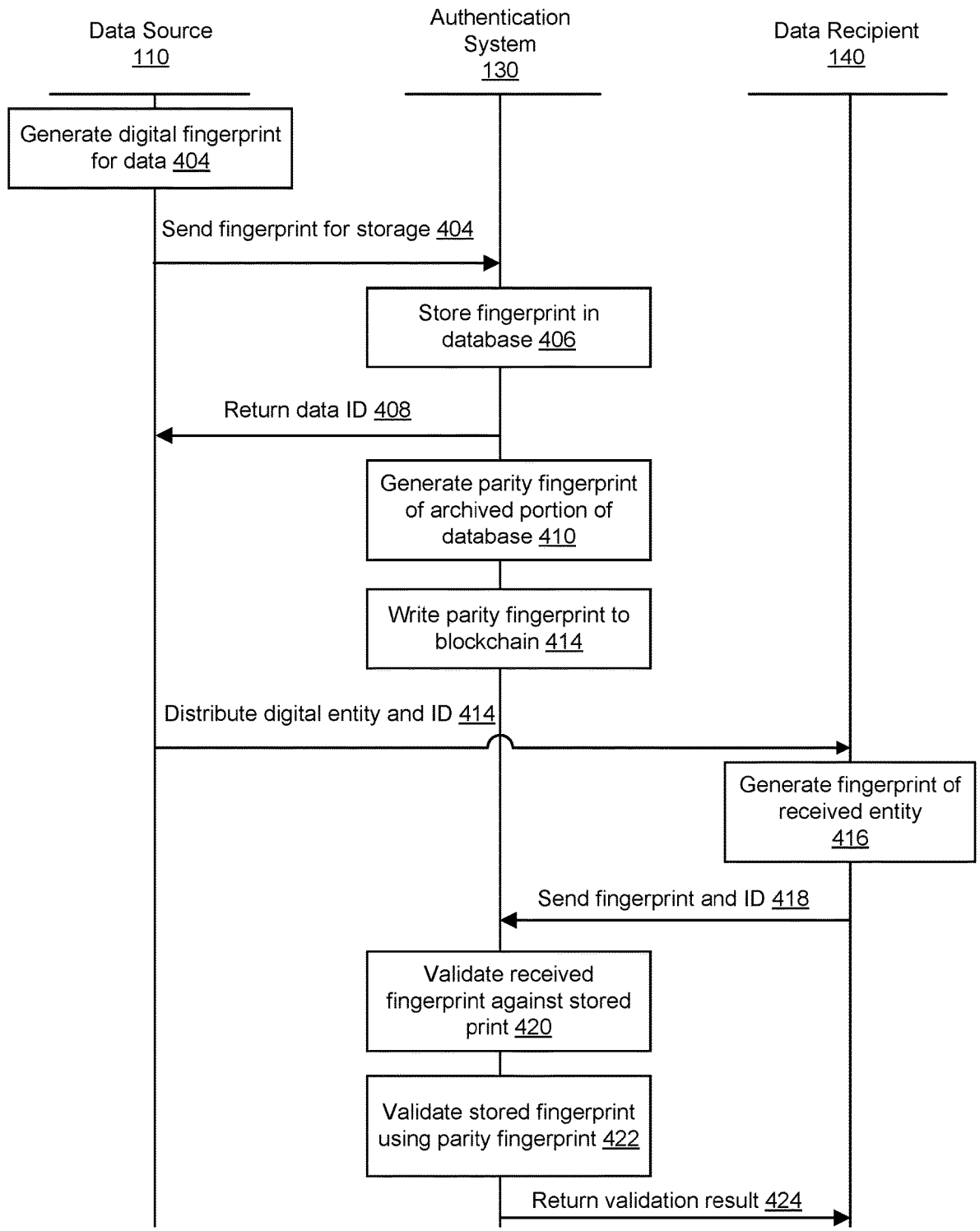
FIG. 4 is an interaction diagram illustrating a process for authenticating digital data using a blockchain-backed parity check, according to some embodiments.

FIG. 4 is an interaction diagram illustrating another process 400 for authenticating digital data using a blockchain-backed parity check, according to some embodiments. As shown in FIG. 4, the process 400 comprises interactions between the data source 110, the authentication system 130, and the data recipient 120. The process 400 can include additional, fewer, or different steps, and the steps can be performed in different orders.

As shown in FIG. 4, the data source 110 generates 402 a digital fingerprint for digital data. The data fingerprinted by the data source 110 may include a single data item (e.g., a number), a collection of data items (e.g., numbers extracted from a spreadsheet), a collection of one or more files (e.g., one or more documents each stored as a unique file), a code repository, or any other data structure, file structure, or logical representation of a set of digital data. At least a portion of the data is represented by the digital fingerprint. The data source 110 may be triggered to generate 402 the fingerprint when the data is created or modified, when the data is requested by a data recipient 120, or at a preset time.

The data source 110 sends 404 the fingerprint to the authentication system 130, which stores 406 the fingerprint in the database 134. The authentication system 130 generates a data identifier uniquely identifying the fingerprint and returns 408 the data ID to the data source 110. The data source 110 retains the data ID to map the data to the fingerprint stored in the database 134.

At periodic intervals, the authentication system 130 archives at least a portion of the database 134 and generates 410 a parity fingerprint of the archived portion. The parity fingerprint is an encoded representation of the fingerprints stored in the database 134, and may be generated, for example, approximately once per hour. The authentication system 130 writes 412 each parity fingerprint to a blockchain 135.

After the data fingerprint has been recorded in the database 134, the data source 110 can share the data with any desired target audience(s) affiliated with one or more of the data recipients 120. To share the data, the data source 110 distributes 414 the data and the data identifier output by the authentication system 130. The data source 110 may use any of a variety of communication channels to send the data to the data recipient 120, including both electronic channels (such as transmitting data over the Internet) and physical channels (such as mailing a physical package to a person associated with the data recipient 120).

The data recipient 120 can authenticate the data at any point after receiving it by generating 416 a digital fingerprint of the received data. The fingerprint of the received data is generated using the same fingerprinting function used by the data source 110. The data recipient 120 sends 418 the generated fingerprint and the data identifier to the authentication system 130 for validation.

The authentication system 130 accesses the fingerprint stored in the database 134 using the data identifier and validates 420 the received fingerprint against the stored fingerprint. In some cases, either automatically or at the request of a data recipient 120, the authentication system 130 may also validate 422 the fingerprint stored in the database 134 using the parity fingerprint stored on the blockchain 135. For example, the authentication system 130 calculates a parity fingerprint of at least a portion of the database 134 including the fingerprint to be validated. The calculated parity fingerprint is compared to the parity fingerprint stored on the blockchain 135 to verify that the fingerprints match. If the fingerprints match, the authentication system 130 determines the fingerprint stored in the database 134 to be correct.

If the fingerprint stored in the database 134 matches the fingerprint received from the data recipient 120, the authentication system 130 returns 424 a validation result indicating that the data entity is valid. The validation result may also verify that the stored fingerprint has been authenticated against the parity fingerprint on the blockchain 135. If the fingerprints do not match, the validation result returned by the authentication system 130 indicates that the data entity has been modified.

According to the example processes described with respect to FIGS. 3-4, the data recipient 120 can use the validation result to verify the accuracy of data. The data recipient 120 can authenticate data using the process described with respect to FIG. 2 any number of times, and any length of time after the data was created. For example, a data recipient 120 can verify the integrity of data months or years after a data source 110 generated or collected the data, and after the data has passed through one or more intermediaries between the data source 110 and the data recipient 120.

In an example use case of the process described in FIGS. 3-4, the data source 110 is a software supplier for autonomous vehicles and the data recipient 120 is an autonomous vehicle. When the software supplier updates code for the vehicle, the supplier registers the updated code by generating a fingerprint representing the code and storing the fingerprint on the blockchain 135. Once it receives the update from the software supplier, the autonomous vehicle can verify that it is executing the correct code by similarly generating a fingerprint and authenticating the generated fingerprint against the stored fingerprint. The autonomous vehicle can verify software integrity and data currency at any time using the process described in FIGS. 3-4. For example, the autonomous vehicle can verify its software and GPS data before each trip.

Figure 5:
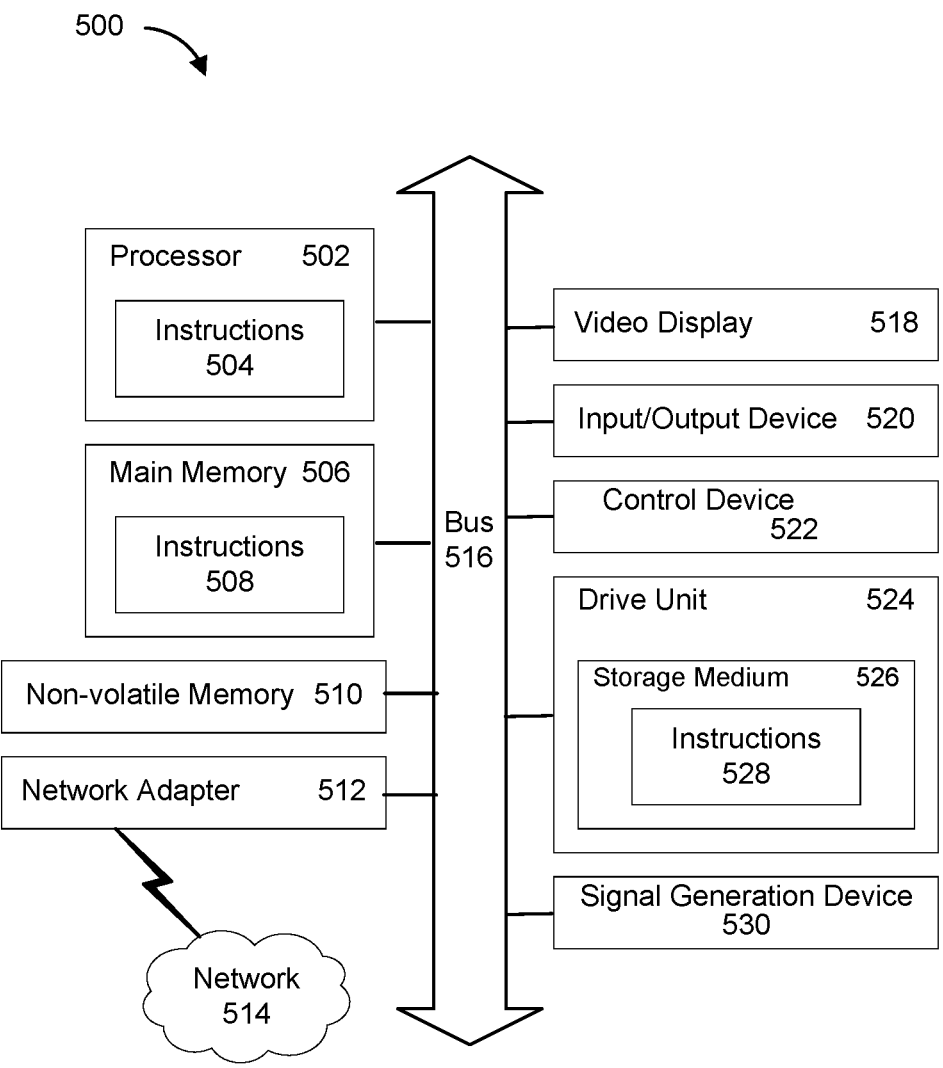
FIG. 5 is a block diagram illustrating an example processing system.

FIG. 5 is a block diagram illustrating an example of a processing system 500 in which at least some operations described herein can be implemented. For example, one or more of the data source 110, data recipient 120, or authentication system 130 may be implemented as the example processing system 500. The processing system 500 may include one or more central processing units ("processors") 502, main memory 506, non-volatile memory 510, network adapter 512 (e.g., network interfaces), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents any one or more separate physical buses, point to point connections, or both connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 594 bus, also called "Firewire."

In various embodiments, the processing system 500 operates as part of a user device, although the processing system 500 may also be connected (e.g., wired or wirelessly) to the user device. In a networked deployment, the processing system 500 may operate in the capacity of a server or a client machine in a client-server network environment, or as a peer machine in a peer-to-peer (or distributed) network environment.

The processing system 500 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 500.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the processing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 510, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 512 enables the processing system 500 to mediate data in a network 514 with an entity that is external to the processing system 500 through any known and/or convenient communications protocol supported by the processing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A data authentication system, comprising:
   a processor; and
   a non-transitory computer readable storage medium storing computer program instructions, the computer program instructions when executed by the processor causing the processor to, in response to receiving a first token generated by a data recipient and an identifier of data distributed to the data recipient from a data source, the first token including an encoded representation of the distributed data:

using the received identifier, query a smart contract stored on a blockchain, the smart contract when queried configured to output a second token that was generated by the data source and that is stored by the smart contract;

validate the first token received from the data recipient against the second token output by the smart contract; and authenticate the data distributed to the data recipient responsive to the validation of the first token received from the data recipient against the second token output by the smart contract.

2. The data authentication system of claim 1, wherein the instructions when executed further cause the processor to:

receive, from the data source, a data fingerprint that encodes original data as stored by the data source;

wherein authenticating the data distributed to the data recipient comprises determining the data distributed to the data recipient matches the original data stored by the data source.

3. The data authentication system of claim 2, wherein the instructions when executed further cause the processor to:

store the data fingerprint that encodes the original data in a database maintained by the data authentication system;

wherein the second token output by the smart contract comprises a parity fingerprint encoding a plurality of data fingerprints stored in the database.

4. The data authentication system of claim 3, wherein validating the first token against the second token comprises:

accessing the data fingerprint representing the data distributed to the data recipient from the database;

generating a fingerprint of at least a portion of the data fingerprints in the database including the accessed data fingerprint;

validating the generated fingerprint against the parity fingerprint; and authenticating the data distributed to the data recipient responsive to the generated fingerprint matching the parity fingerprint.

5. The data authentication system of claim 2, wherein the second token includes the data fingerprint that encodes the original data.

6. The data authentication system of claim 5, wherein the instructions when executed further cause the processor to:

write the second token into the smart contract on the blockchain;

receive an identifier of the original data responsive to writing the smart contract on the blockchain; and send the identifier of the original data to the data source to distribute with the data as the identifier of the data distributed to the data recipient.

7. The data authentication system of claim 1, wherein the data distributed to the data recipient is distributed from the data source to an intermediate system and from the intermediate system to the data recipient.

8. A method comprising:

receiving at a data authentication system, a request from a data recipient to authenticate a digital entity distributed to the data recipient from a data source, the request including a first token that represents the digital entity as received by the data recipient;

querying, by the data authentication system, a smart contract stored on a blockchain to retrieve a second token stored by the smart contract, wherein the second token was received at the data authentication system from the data source and represents the digital entity as generated by the data source; and authenticating, by the data authentication system, the first token against the second token.

9. The method of claim 8, further comprising:

receiving, from the data source, a data fingerprint that encodes an original digital entity as stored by the data source; and authenticating determining the digital entity distributed to the data recipient matches the original digital entity stored by the data source by authenticating the first token against the second token.

10. The method of claim 9, further comprising:

storing the data fingerprint that encodes the original digital entity in a database maintained by the data authentication system;

wherein the first token output by the smart contract comprises a parity fingerprint encoding a plurality of data fingerprints stored in the database.

11. The method of claim 10, wherein validating the first token against the second token comprises:

accessing the data fingerprint representing the digital entity distributed to the data recipient from the database;

generating a fingerprint of at least a portion of the data fingerprints in the database including the accessed data fingerprint;

validating the generated fingerprint against the parity fingerprint; and authenticating the digital entity distributed to the data recipient responsive to the generated fingerprint matching the parity fingerprint.

12. The method of claim 11, wherein the first token includes the data fingerprint that encodes the original digital entity, and wherein the method further comprises:

writing the first token into the smart contract on the blockchain;

receiving an identifier of the original digital entity responsive to writing the smart contract on the blockchain; and sending the identifier of the original digital entity to the data source to distribute with the original digital entity as the identifier of the digital entity distributed to the data recipient.

13. The method of claim 8, wherein the digital entity distributed to the data recipient is distributed from the data source to an intermediate system and from the intermediate system to the data recipient.

14. A non-transitory computer readable storage medium storing computer program instructions, the computer program instructions when executed by a processor causing the processor to:

query a smart contract stored on a blockchain using an identifier of a digital entity that was previously distributed to a data recipient from a data source, wherein the smart contract when queried is configured to output a first token;

validate the first token against a second token received from the data recipient; and authenticate the digital entity distributed to the data recipient responsive to the validation of the first token output by the smart contract against the second token received from the data recipient.

15. The non-transitory computer readable storage medium of claim 14, wherein the instructions when executed further cause the processor to:

receive, from the data source, a data fingerprint that encodes an original digital entity as stored by the data source;

wherein authenticating the digital entity distributed to the data recipient comprises determining the digital entity distributed to the data recipient matches the original digital entity stored by the data source.

16. The non-transitory computer readable storage medium of claim 15, wherein the instructions when executed further cause the processor to:

store the data fingerprint that encodes the original digital entity in a database;

wherein the first token output by the smart contract comprises a parity fingerprint encoding a plurality of data fingerprints stored in the database.

17. The non-transitory computer readable storage medium of claim 16, wherein validating the first token against the second token comprises:

accessing the data fingerprint representing the digital entity distributed to the data recipient from the database;

generating a fingerprint of at least a portion of the data fingerprints in the database including the accessed data fingerprint;

validating the generated fingerprint against the parity fingerprint; and authenticating the digital entity distributed to the data recipient responsive to the generated fingerprint matching the parity fingerprint.

18. The non-transitory computer readable storage medium of claim 15, wherein the first token includes the data fingerprint that encodes the original digital entity.

19. The non-transitory computer readable storage medium of claim 18, wherein the instructions when executed further cause the processor to:

write the first token into the smart contract on the blockchain;

receive an identifier of the original digital entity responsive to writing the smart contract on the blockchain; and send the identifier of the original digital entity to the data source to distribute with the original digital entity as the identifier of the digital entity distributed to the data recipient.

20. The non-transitory computer readable storage medium of claim 14, wherein the digital entity distributed to the data recipient is distributed from the data source to an intermediate system and from the intermediate system to the data recipient.

* * * * *